(12) United States Patent
Park et al.

(10) Patent No.: US 10,039,224 B2
(45) Date of Patent: Aug. 7, 2018

(54) DRAFT CONTROL DEVICE FOR TRACTOR AND TRACTOR INCLUDING SAME

(71) Applicant: DAEDONG INDUSTRIAL CO., LTD., Daegu (KR)

(72) Inventors: Ju Hwan Park, Changnyeong-gun (KR); Byoung Soo Kwon, Changnyeong-gun (KR)

(73) Assignee: DAEDONG INDUSTRIAL CO., LTD., Daegu (KR)

(*) Notice: Subject to any disclaimer, the term of this patent is extended or adjusted under 35 U.S.C. 154(b) by 0 days.

(21) Appl. No.: 15/351,870

(22) Filed: Nov. 15, 2016

(65) Prior Publication Data

US 2017/0135276 A1    May 18, 2017

(30) Foreign Application Priority Data

Nov. 18, 2015  (KR) .................. 10-2015-0162036

(51) Int. Cl.
*A01B 63/10*     (2006.01)
*A01B 63/112*    (2006.01)

(52) U.S. Cl.
CPC ............ *A01B 63/112* (2013.01); *A01B 63/10* (2013.01)

(58) Field of Classification Search
CPC ..... A01B 59/004; A01B 63/10; A01B 63/112; A01B 63/114
USPC ........ 73/862.57, 862.632; 172/7, 9, 12, 239, 172/261; 280/446.1, 449
See application file for complete search history.

(56) References Cited

U.S. PATENT DOCUMENTS

| 4,411,319 A | * | 10/1983 | Wood | A01B 63/112 172/10 |
| 4,438,818 A | * | 3/1984 | Treichel | A01B 63/112 172/9 |
| 5,042,586 A | * | 8/1991 | Spencer | A01B 63/112 172/7 |

(Continued)

FOREIGN PATENT DOCUMENTS

| AT | 299-596 B | 6/1972 |
| DE | 1255976 B | 12/1967 |

(Continued)

OTHER PUBLICATIONS

European search report for European Patent Application No. 16199132.8 dated May 11, 2017 corresponding to the above-referenced U.S. application.

*Primary Examiner* — Robert E Pezzuto
(74) *Attorney, Agent, or Firm* — LRK Patent Law Firm

(57) ABSTRACT

A draft control device of tractor includes a top link fixing bracket fixed at the rear side of the tractor, a top link swing bracket hinge-coupled to the top link fixing bracket through a connection pin, and carrying out rotational motion with respect to the axial center of the connection pin according to the change of the compressive force of a top link in response to the change of work machine traction resistance, a leaf spring provided between the top link fixing bracket and the top link swing bracket to supply restoring force for the rotational motion of the top link swing bracket with respect to the top link fixing bracket, and a sensitivity adjustment unit provided between the top link swing bracket and the leaf spring, and changing an acting point, where the top link swing bracket pushes the leaf spring, to adjust work machine traction load sensitivity.

14 Claims, 6 Drawing Sheets

(56) References Cited

U.S. PATENT DOCUMENTS

| | | | | |
|---|---|---|---|---|
| 5,584,347 A * | 12/1996 | Bennett | ............... | A01B 63/112 172/7 |
| 7,357,036 B2 * | 4/2008 | Steprath | ............... | A01B 63/112 73/767 |
| 7,798,241 B2 * | 9/2010 | Muzzy | ............... | A01B 63/112 172/239 |
| 7,954,556 B2 * | 6/2011 | Hou | ............... | A01B 63/112 172/3 |
| 9,347,844 B2 * | 5/2016 | Tilkes | ............... | G01L 5/136 |
| 9,706,696 B2 * | 7/2017 | Gschwendtner | ............... | A01B 63/112 |

FOREIGN PATENT DOCUMENTS

| | | |
|---|---|---|
| JP | 58-100507 U | 7/1983 |
| JP | 06-41405 U | 6/1994 |
| JP | 2006-333741 A | 12/2006 |

* cited by examiner

DRAFT CONTROL DEVICE FOR TRACTOR AND TRACTOR INCLUDING SAME

CROSS REFERENCE TO RELATED APPLICATION

The present application claims the benefit of Korean Patent Application No. 10-2015-0162036 filed in the Korean Intellectual Property Office on Nov. 18, 2015, the entire contents of which are incorporated herein by reference.

BACKGROUND OF THE INVENTION

1. Field of the Invention

The present invention relates to a draft control device of a tractor and, more particularly, to a draft control device of a tractor, which automatically lifts a three-point hitch so as to decrease a traction load when the plowing depth of a work machine, which is connected to the three-point hitch at the rear side of a tractor, becomes excessively deep while working such that an overload is applied, and a tractor including the same.

2. Description of Related Art

In general, tractors have advantages in the structure and characteristics of providing a work machine to a rear hitch so as to carry out various work depending on the purpose. For example, it is possible to carry out various farm work, for example, clod breaking, disease and insect pest control, pumping work, threshing and the like, by attaching a work machine, for example, a rake, a rotavator, a plow, a harrow and the like, to the hitch.

Such a hitch is lifted or lowered according to the lever operation of a control device provided in the vicinity of the operator seat of a tractor such that the height of a work machine provided to the hitch is controlled. Therefore, when carrying out a target work in a state, in which a work machine is attached to the rear side of a tractor, a worker carry out appropriate work according to the kind of the work machine by appropriately operating the lever disposed in the vicinity of the operator seat.

In the case where plow work is to be carried out using a plow among the work machines attached to the rear side of a tractor, there is difficulty of varying degrees depending on the soil condition in maintaining desired plowing depth due to the characteristics of the plow since a plow blade is likely to grow in the soil during the plow work. Particularly, as the plowing depth is increased gradually, a work machine traction load is also increased, resulting in the generation of tractor slip and the increase of fuel consumption.

Accordingly, a draft control device is provided to the tractor so as to maintain a uniform traction load in active response to the traction load which changes during the plow work. This draft control device helps the smooth plow work without overload by automatically lifting the three-point hitch, when the plowing depth of the work machine, which is connected to the three-point hitch at the rear side of the tractor, becomes excessively deep, resulting in the overload.

FIG. 1 is a schematic diagram for illustrating a state, in which a plow is attached to a three-point hitch at the rear side of a tractor.

As shown in FIG. 1, during forward driving in a state, in which a plow 1 is attached to a three-point hitch, plow resistance is generated in the opposite direction of the driving direction. Further, as the plow work progresses, the plow 1 grows in the soil increasingly, resulting in the increase of the plow resistance. A lower link 2 is applied with an excessive traction load due to thus increased plow resistance and so the plow is rotated in the counterclockwise direction with respect to the hinge point 8 of the lower link 2.

The rotational motion of the plow 1 with respect to the hinge point 8 is transmitted to a top link bracket 4 through a top link 3 and, by the force, the top link bracket 4 is rotated in the clockwise direction relative to a top link bracket hinge point 9, wherein a traction load-sensing rod 6, which is connected to the top link bracket 4 is pushed in an arrow direction such that oil pressure corresponding to the displacement of the traction load-sensing rod 6 is compensated by a lifting cylinder through a lifting control valve (not shown) and thus the plow is lifted by a predetermined height.

FIG. 2 is a cross-sectional view of a prior art draft control device of FIG. 1, which includes the top link bracket.

Referring to FIG. 2, the top link bracket 4 has an upper end hinge-coupled to a cylinder body 5, which is integrally formed at the rear side of the mission case of the tractor, and a lower end for providing restoring force in a direction for pushing the top link 3, which is connected to the top link bracket 4, through a traction guide pin 11, which is elastically supported by a traction spring 10. Herein, the top link bracket 4 has a plurality of top link connection holes a, b, c, which are different in height.

In this prior art draft control device, the sensitivity of the draft control function is largely differed depending on the position of the top link connection holes a, b, c of the top link 3, at which the work machine (the plow 1) and the top link bracket 4 are connected to each other, that is, which one of the top link connection holes a, b, c of the top link 3 is used for connecting the work machine (the plow 1) and the top link bracket 4. In other words, the sensitivity of the draft control function (the draft function) can be adjusted by changing the use position of the holes of the top link bracket 4.

In the structure, in which the three connection holes are formed as shown in FIG. 2, if the top link 3 is connected to the upper hole a, the draft control function is not executed while, if the top link 3 is connected to the lower hole c, the top link bracket 4 sensitively reacts even to small force and thus the draft control function is executed. Of course, in the case of the middle hole b, the top link bracket 4 reacts less sensitively, compared with the connection to the lower hole c.

As described above, the prior art draft control device appropriately adjusts the sensitivity of the draft control device depending on the soil condition by connecting the top link to appropriate one of the plurality of connection holes. However, the prior art draft control device has disadvantages that a pin has to be inconveniently separated so as to change the position of the connection hole to be used whenever adjusting the sensitivity and more delicate sensitivity adjustment than intervals among the holes cannot be realized since the positions of the holes are fixed.

PRIOR ART DOCUMENT

Patent Document

[Patent Document 1] Japanese Patent laid-open Publication No. 2006-333741 Published on 14 Dec. 2006

SUMMARY OF THE INVENTION

Accordingly, the present invention has been made to solve the above-mentioned problems occurring in the prior arts, and it is an objective of the present invention to provide a draft control device of a tractor, in which the sensitivity of the draft control device for automatically controlling plowing depth during plow work can be finely adjusted and the sensitivity adjustment can be easily carried out, and tractor including the same.

To accomplish the above objectives, according to one aspect of the present invention, there is provided a draft control device of a tractor, which automatically lifts a three-point hitch so as to decrease a traction load when the plowing depth of a work machine, which is connected to the three-point hitch at the rear side of a tractor, becomes excessively deep while working such that an overload is applied, and comprises: a top link fixing bracket fixed at the rear side of the tractor; a top link swing bracket hinge-coupled to the top link fixing bracket through a connection pin, and carrying out rotational motion with respect to the axial center of the connection pin according to the change of the compressive force of a top link in response to the change of work machine traction resistance; a leaf spring provided between the top link fixing bracket and the top link swing bracket so as to supply restoring force for the rotational motion of the top link swing bracket with respect to the top link fixing bracket, and a sensitivity adjustment unit provided between the top link swing bracket and the leaf spring, and changing an acting point, at which the top link swing bracket pushes the leaf spring, so as to adjust work machine traction load sensitivity.

The top link swing bracket applied to the draft control device according to the one aspect of the present invention may have top link mounting holes formed at opposite upper ends in a diagonal direction relative to a hinge point, at which the top link swing bracket is connected to the top link fixing bracket by the connection pin, and the top link mounting holes may be connected to one end portion of the top link, which is connected to a work machine, such that the top link can be bent.

In addition, the leaf spring may be fixed to a fixing member of the top link fixing bracket through a spring fixing member at the lower end portion thereof so as to be disposed in parallel to the fixing member at a predetermined distance.

Further, the sensitivity adjustment unit may include a height adjustment rotation bolt rotationally provided to the top link swing bracket, and a push, of which a vertical position, at which the push comes into contact with the leaf spring, varies according to the rotational operation of the rotation bolt.

Herein, the push is screw-coupled to the rotation bolt, and slidingly comes into contact with a surface of the top link swing bracket, which face the leaf spring, and the left spring respectively at one side and the other side thereof with respect to a portion of the push, which is screw-coupled with the rotation bolt.

It is preferably that the push has a plane in a rectangular shape and a side surface portion, which comes into contact with the leaf spring, in a convexly curved shape.

The draft control device, according to the one aspect of the present invention, may further comprise a feedback link for connecting the top link swing bracket and a lifting control valve, which controls the lifting of the three-point hitch, such that the top link swing bracket and the lifting control valve can operate in association with each other.

To accomplish the above objectives, according to another aspect of the present invention, there is provided a tractor, comprising: the draft control device according to the one aspect of the present invention; and a lifting control valve for compensating the oil pressure of a three-point hitch lifting cylinder in proportion to a displacement of the draft control device, which is displaced according to a traction load change of a work machine.

According to an embodiment of the present invention, it is possible to easily and rapidly change the sensitivity of the plowing depth adjustment during plow work can be rapidly and easily changed depending on the soil condition of a work target site by simply adjusting the height of the push, which comes into contact with the leaf spring, through the rotation of the bolt of the sensitivity adjustment unit.

In addition, it is possible to more finely adjust the sensitivity (the reactivity with respect to the compressive force transmitted through the top link when soil condition or the plowing depth is changed during the plow work) by changing the acting point, at which the leaf spring is pushed, through the height adjustment of the push, which comes into contact with the leaf spring, thereby executing optimum draft control function according to the soil condition.

DETAILED DESCRIPTION OF THE PREFERRED EMBODIMENTS

Reference will be now made in detail to the preferred embodiments of the present invention with reference to the accompanying drawings. In the description of the present invention, the detailed description of well-known elements will be omitted and, when it is judged that detailed description of elements related with the present invention may make the essential points vague unnecessarily, the detailed descriptions of the elements will be omitted.

Figure 3:
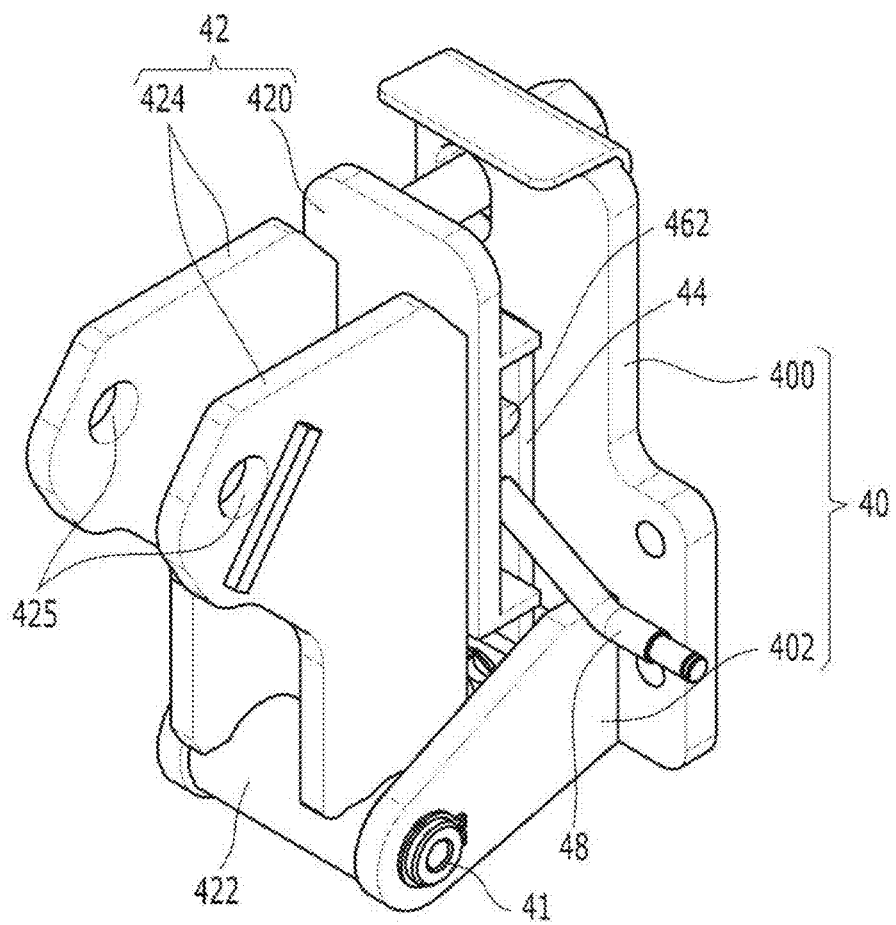
FIG. 3 is a perspective view for illustrating a draft control device of a tractor according to an embodiment of the present invention.
Figure 4:
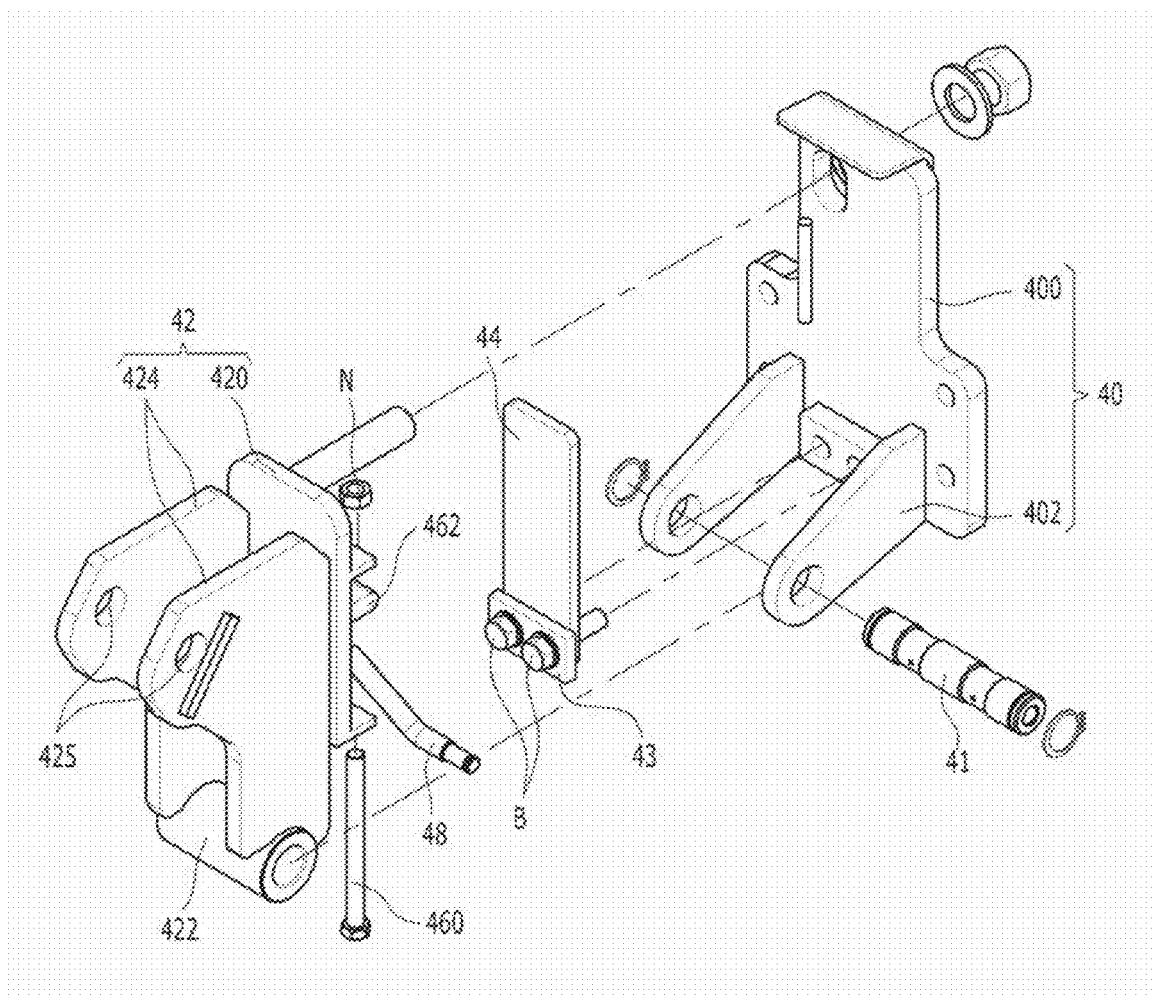
FIG. 4 is an exploded perspective view for illustrating the draft control device of FIG. 3.
Figure 5:
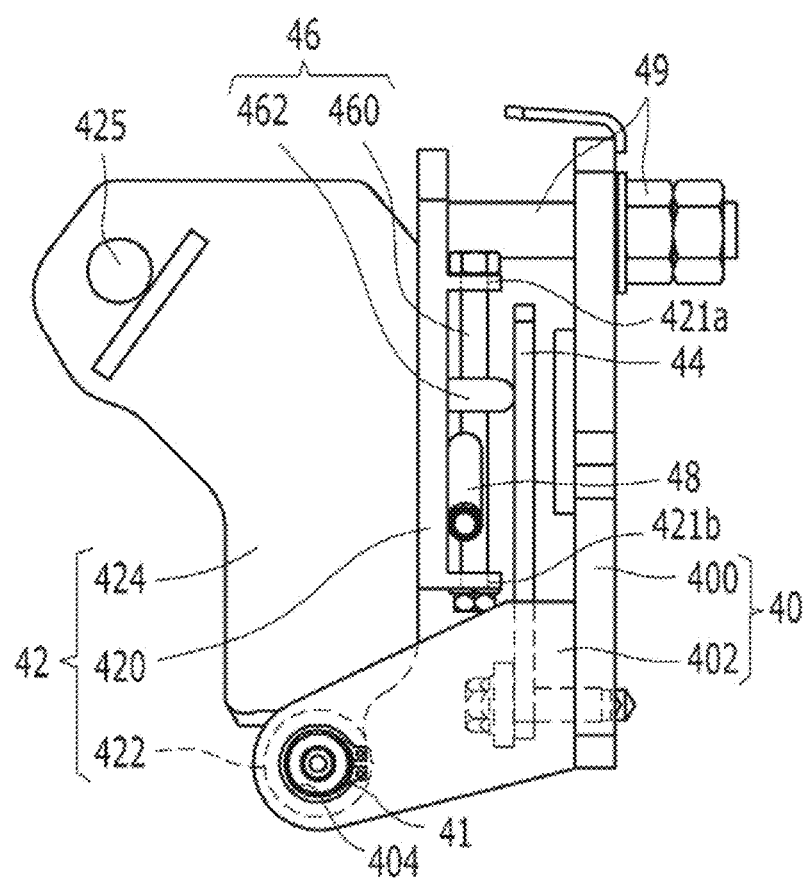
FIG. 5 is a side view for illustrating the draft control device of FIG. 3.
Figure 6:
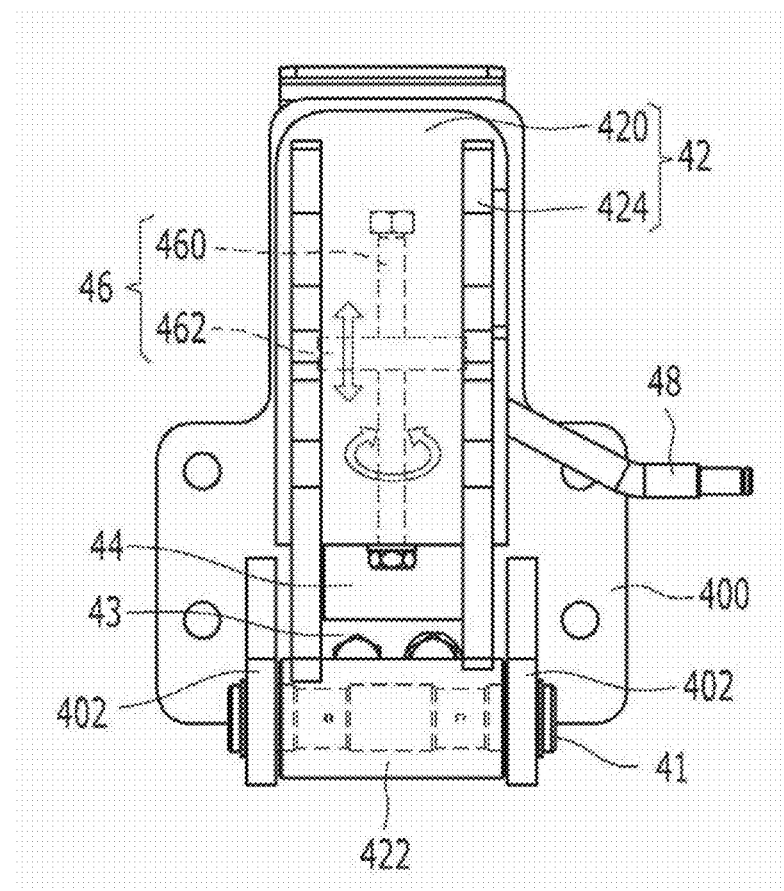
FIG. 6 is a front view for illustrating the draft control device of FIG. 3.

FIG. 3 is a perspective view for illustrating a draft control device of a tractor according to an embodiment of the present invention, FIG. 4 is an exploded perspective view for illustrating the draft control device of FIG. 3, FIG. 5 is a side view for illustrating the draft control device of FIG. 3, FIG. 6 is a front view for illustrating the draft control device of FIG. 3.

Referring to FIG. 3 to FIG. 6, a draft control device according to the present invention is to automatically lift a three-point hitch so as to decrease a traction load when the plowing depth of a plow, which is connected to the three-point hitch at the rear side of a tractor, becomes excessively deep while working such that an overload is applied, and mainly includes a top link fixing bracket 40, a top link swing bracket 42, a leaf spring 44, a sensitivity adjustment unit 46, and a feedback link 48.

The top link fixing bracket 40 is fixed at the rear side of the tractor and, preferably, at the rear end of a cylinder body (see. 5 in FIG. 7), which is integrally formed at the mission case of the tractor, by a bolt. The top link fixing bracket 40 includes a plate-shaped fixing member 400 having a bolt hole (reference sign omitted)), and one pair of right and left support plates 402, which are disposed at the lower portion of the front surface of the fixing member 400 such that the facing surfaces of the one pair of right and left support plates 402 are disposed in parallel to each other.

The one pair of right and left support plates 402 of the top link fixing bracket 40, which face each other, have pin holes 404 formed at the front ends thereof, and a connection pin 41 is assembled into the pin holes 404 such that the top link swing bracket 42 can be rotatably connected to the top link fixing bracket 40. That is, the top link swing bracket 42 is hinge-coupled to the top link fixing bracket 40 through the connection pin 41 so as to carry out rotational motion with respect to the axial center of the connection pin 41.

A mounting surface (reference sign omitted) is formed between the support plates 402 of the top link fixing bracket 40 so as to mount the leaf spring 44, wherein a part of the lower end of the leaf spring 44 is strongly arrested by a bolt B between a spring fixing member 43, which is coupled to the mounting surface, and the mounting surface such that the leaf spring 44 is positioned between the top link fixing bracket 40 and the top link swing bracket 42 after the assembly.

The top link swing bracket 42 is hinge-coupled to the top link fixing bracket 40 through the connection pin 41, as described above. Therefore, when the compressive force of a top link is changed in response to the change of work machine traction resistance, the top link swing bracket 42 carries out the rotational motion with respect to the axial center of the connection pin 41 in association with the change of the compressive force of the top link. Herein, the top link is connected to the upper ends of the top link swing bracket 42, wherein the upper ends of the top link swing bracket 42 are opposite in a diagonal direction to the hinge point, at which the top link swing bracket 42 is connected to the top link fixing bracket 40 by the connection pin 41.

The top link swing bracket 42 specifically includes a cylindrical sleeve 422 penetrated by the connection pin 41 so as to form the hinge part, and one pair of right and left top link connection plates 424, each of which lower surface comes into close contact with a part of the outer circumference of the sleeve 422 so as to be fixed thereon by welding and of which facing surfaces are disposed in parallel to each other. Further, the top link swing bracket 42 includes a top link swing bracket 42, which connects the top link connection plates 424 to each other and faces the fixing member 400 through the leaf spring 44 positioned therebetween.

The top link connection plates 424 of the top link swing bracket 42 have top link mounting holes 425 formed at the upper ends thereof (in a diagonal direction with respect to the hinge point, at which the top link swing bracket 42 is connected to the top link fixing bracket 40 by the connection pin 41), such that one end of the top link (see, 30 in FIG. 7), which has a retractable structure for flexibly connecting the work machine (the plow) to the top link swing bracket 42, is connected to the top link mounting holes 425, wherein the top link can be bent.

Therefore, during forward driving in a state, in which the plow is attached to the three-point hitch, when plow resistance is generated in the opposite direction of the driving direction, the compressive force transmitted to the top link is transmitted to the top link swing bracket 42 as it is, wherein the top link swing bracket 42 is rotated by the force with respect to the hinge point by the connection pin 41 in a direction, in which the top link swing bracket 42 comes towards the top link fixing bracket 40.

The leaf spring 44 generates restoring force, between the top link fixing bracket 40 and the top link swing bracket 42, for the rotational motion of the top link swing bracket 42, which is carried out with respect to the top link fixing bracket 40 as described above. That is, when the top link swing bracket 42 is rotated, by the compressive force of the top link, with respect to the hinge point in the top link fixing bracket 40 direction towards the top link fixing bracket 40, the leaf spring 44 is elastically displaced by the push 462 of the sensitivity adjustment unit 46, which will be described hereinafter, so as to store the restoring force.

As described hereinabove, the lower end portion of the leaf spring 44 is arrested by the spring fixing member 43 onto the mounting surface, which is formed on the fixing member 400 between the support plates 402 of the top link fixing bracket 40 such that the leaf spring 44 may be disposed to face the fixing member 400 in parallel to the fixing member 400 at a predetermined distance therefrom, wherein the thickness or the material of the leaf spring depends on the setting level of the sensitivity and is thus not particularly limited.

The sensitivity adjustment unit 46 applied to the draft control device according to the embodiment of the present invention is provided between the top link swing bracket 42 and the leaf spring 44 so as to serve to adjust the work machine traction load sensitivity. Specifically, the sensitivity adjustment unit 46 adjusts the work machine traction load sensitivity by changing an acting point, at which the top link swing bracket 42 pushes the leaf spring 44 between the top link swing bracket 42 and the leaf spring 44.

The sensitivity adjustment unit 46 includes, specifically, a height adjustment rotation bolt 460, which is provided to the top link swing bracket 42 so as to carry out rotational motion, and the push 462, of which a vertical position, at which the push 462 comes into contact with the leaf spring 44, varies according to the rotational operation of the rotation bolt 460. Herein, the push 462 is screw-coupled to the rotation bolt 460, and the rotation bolt 460 is rotatably supported by upper and lower support means 421a, 421b of the connection member 420 and fixed by a nut N, which is coupled at the upper portion of the upper support means 421a.

The push 462 may be disposed so as to slidingly come into contact with a surface of the top link swing bracket 42, which face the leaf spring 44, and the left spring 44 respectively at one side and the other side thereof with respect to a portion of the push 462, which is screw-coupled with the rotation bolt 460. Herein, the push 462 has a plane in a rectangular shape and a side surface portion, which comes into contact with the leaf spring 44, in a convexly curved shape.

Meanwhile, the feedback link 48 is attached to the top link swing bracket 42 and connects the top link swing bracket 42 and a lifting control valve (see, 50 in FIG. 7), which controls the lifting of the three-point hitch at the rear side of the tractor, such that the top link swing bracket 42 and the lifting control valve can operate in association with each other. That is, if the top link swing bracket 42 is rotated in the top link fixing bracket 40 direction by the compressive force, the feedback link 48 converts the rotational motion to linear motion so as to transmit the linear motion to the lifting control valve.

In FIG. 5, unexplained reference sign 49 indicates a stopper for limiting the rotation of the top link swing bracket 42 in a direction away from the top link fixing bracket 40, and may include a bolt, which is fixed to a surface of the top link swing bracket 42 and extended towards the other surface side of the top link swing bracket 42 by penetrating the top link fixing bracket 40, and two or more nuts, which are coupled to the front end of the bolt penetrating the top link fixing bracket 40, as shown in FIG. 5.

Now, the operation of the draft control device of a tractor, according to an embodiment of the present invention structured as above, will be described with reference to FIG. 7.

Figure 1:
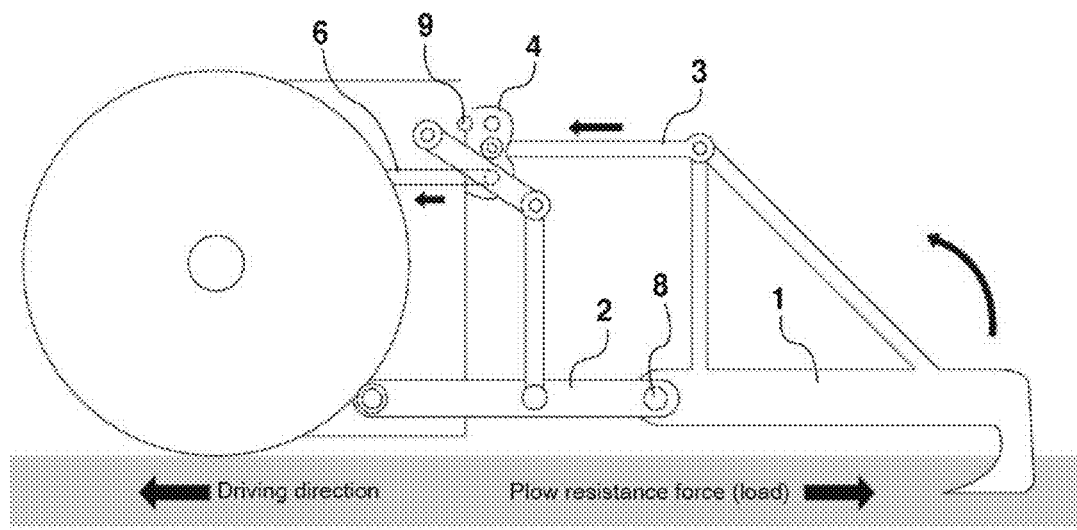
FIG. 1 is a schematic diagram for illustrating a state, in which a plow is attached to a three-point hitch at the rear side of the tractor.
Figure 2:
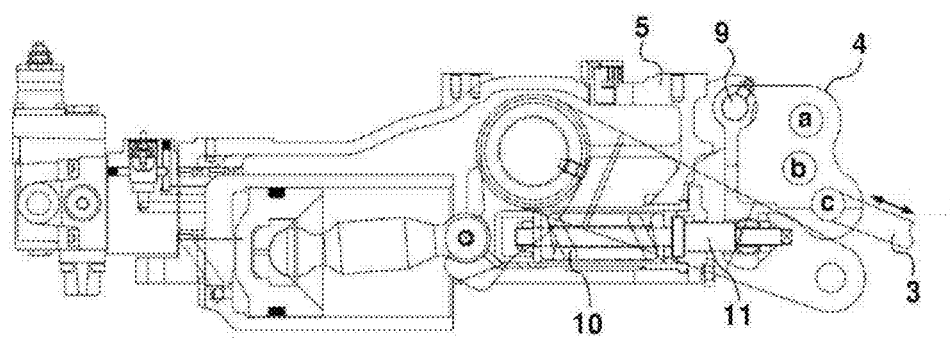
FIG. 2 is a cross-sectional view of a prior art draft control device of FIG. 1, which includes a top link bracket.
Figure 7:
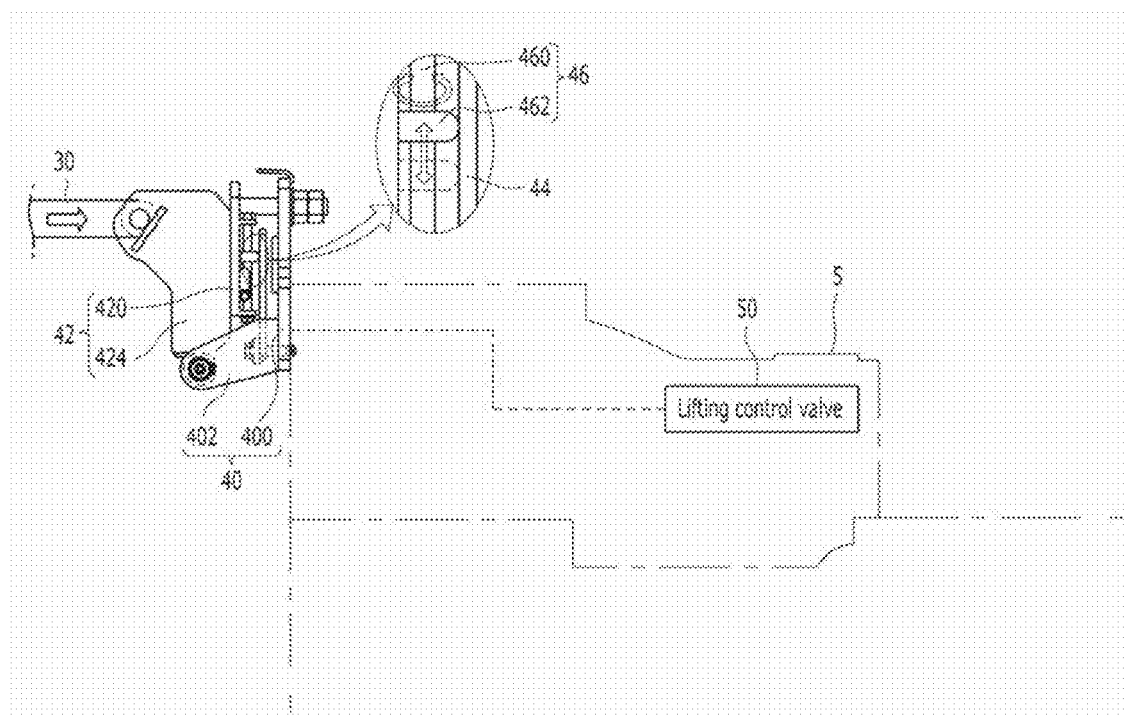
FIG. 7 is a view for illustrating an operation state of the draft control device according to an embodiment of the present invention.

Referring to FIG. 7, the top link 30 is applied with force in the compression direction thereof by the plow resistance (the traction load) generated during the plow work in a state, in which the end of the top link is connected to the top link swing bracket 42 (see, the description relating to FIG. 1) with respect to background art, and the top link swing bracket 42 is rotated, by the force, in the top link fixing bracket 40 direction with respect to the hinge point by the connection pin 41.

In response to the rotation of the top link swing bracket 42, the feedback link 48 is pushed in the arrow direction by a horizontally linear distance corresponding to the rotational displacement and thus opens the lifting control valve 50. Then, the oil pressure corresponding to the displacement of the feedback link 48 is compensated for the lifting cylinder, which forms the three-point hitch, through the lifting control valve 50 such that the plow is lifted by a predetermined height and thus the plow resistance is decreased.

Meanwhile, in the rotational motion of the top link swing bracket 42 with respect to the top link fixing bracket 40 as described hereinabove, the leaf spring 44 is elastically displaced by the push 462 at the top link swing bracket 42 side in the rotation direction of the top link swing bracket 42, wherein the sensitivity that the top link swing bracket 42 reacts to the force transmitted through the top link 30 can be adjusted by changing the acting point, at which the push 462 pushes the leaf spring 44, through the rotation bolt 460.

That is, if the rotation bolt 460 is rotated in the clockwise or counterclockwise direction, the push 462 moves up or down such that the vertical position of the push 462, at which the push 462 comes into contact with the leaf spring 44, varies. In addition, the acting point, at which the push 462 pushes the leaf spring 44, is changed relative to the fixed end at the lower portion of the leaf spring 44 such that the sensitivity that the top link swing bracket 42 reacts to the force and, by extension, the sensitivity of the plowing depth adjustment function can be adjusted by the draft control device according to the embodiment of the present invention.

For example, if the acting point is formed such that the push 462 comes into contact with the leaf spring 44 at a relatively high position through the position adjustment of the rotation bolt 460, the top link swing bracket 42 reacts even to small force and thus the draft control function the plowing depth adjustment function is executed. Meanwhile, if the push 462 comes into contact with the leaf spring 44 at a relatively low position, then the reactivity of the top link swing bracket 42 is decreased and thus relatively decreased draft control function is executed.

In other words, if the push 462 is positioned at an upper portion so as to decrease the sensitivity, the hitch is not lifted even at a relatively high traction load such that the plowing depth of the work machine can be maintained to be deep and, if the push 462 is positioned at a lower portion so as to increase the sensitivity, the hitch is lifted even at a relatively low traction load and then lowered as the traction load is much lowered such that the plowing depth of the work machine can be maintained to be relatively shallow.

As a result, the draft control device according to the embodiment of the present invention can adjust the sensitivity of the automatic plowing depth adjustment of a plow at a desired level by adjusting the vertical position of the push 462 through the height adjustment rotation bolt 460.

As described hereinabove, according to the embodiment of the present invention, the sensitivity of the plowing depth adjustment during plow work can be rapidly and easily changed depending on the soil condition of a work target site by simply adjusting the height of the push, which comes into contact with the leaf spring, through the rotation of the bolt of the sensitivity adjustment unit.

In addition, the sensitivity (the reactivity with respect to the compressive force transmitted through the top link when the soil condition or the plowing depth is changed during the plow work) can be more finely adjusted by changing the acting point, at which the leaf spring is pushed, through the height adjustment of the push, which comes into contact with the leaf spring, thereby executing optimum draft control function according to the soil condition.

As described above, while the present invention has been particularly shown and described with reference to the example embodiments thereof only, it will be understood by those of ordinary skill in the art that the above embodiments of the present invention are all exemplified and various changes, modifications and equivalents may be made therein without changing the essential characteristics and scope of the present invention. Therefore, it would be understood that the present invention is not limited to the forms described in the example embodiments and the technical and protective scope of the present invention shall be defined by the following claims. In addition, it should be also understood that all modifications, changes and equivalences within the technical scope of the present invention defined by the following claims belong to the technical scope of the present invention.

What is claimed is:

1. A draft control device of a tractor, which automatically lifts a three-point hitch to decrease a traction load when a work machine, which is connected to the three-point hitch at a rear side of the tractor, plows so deep that the traction load becomes excessive, the draft control device comprising:
    a top link fixing bracket (40) fixed at the rear side of the tractor;
    a top link swing bracket (42) hinge-coupled to the top link fixing bracket (40) through a connection pin (41), and carrying out a rotational motion with respect to an axial center of the connection pin (41) according to a change of a compressive force of a top link which is caused by a change of a traction resistance of the work machine;
    a leaf spring (44) provided between the top link fixing bracket (40) and the top link swing bracket (42) to supply a restoring force for the rotational motion of the top link swing bracket (42) with respect to the top link fixing bracket (40); and
    a sensitivity adjustment unit (46) provided between the top link swing bracket (42) and the leaf spring (44), and changing an acting point, at which the top link swing bracket (42) pushes the leaf spring (44), to adjust a traction load sensitivity of the work machine.

2. The draft control device according to claim 1, wherein:
    the top link swing bracket (42) has top link mounting holes (425) formed at opposite upper ends in a diagonal direction relative to a hinge point, at which the top link swing bracket (42) is hinge-connected to the top link fixing bracket (40) by the connection pin (41), and one end portion of the top link, connected to the work machine is bendably connected to the top link mounting holes (425).

3. The draft control device according to claim 1, wherein the leaf spring (44) is fixed to a fixing member (400) of the top link fixing bracket (40) through a spring fixing member (43) at a lower end portion of the leaf spring (44) so as to be spaced apart from and parallel to the fixing member (400).

4. The draft control device according to claim 1, wherein the sensitivity adjustment unit (46) includes:
- a height adjustment rotation bolt (460) rotationally provided to the top link swing bracket (42); and
- a push (462) whose vertical position, at which the push (462) comes into contact with the leaf spring (44), varies according to a rotational operation of the height adjustment rotation bolt (460).

5. The draft control device according to claim 4, wherein the push (462) is screw-coupled to the height adjustment rotation bolt (460), and slidingly comes into contact with a surface of the top link swing bracket (42), which faces the leaf spring (44), and the leaf spring (44), respectively, at one side and an opposite side of a portion of the push (462), which is screw-coupled with the height adjustment rotation bolt (460).

6. The draft control device according to claim 4, wherein:
the push (462) has a rectangular shape in a plan view:, and
a side surface portion of the push (462), which comes into contact with the leaf spring (44), has a convexly curved shape.

7. The draft control device according to claim 1, further comprising:
a feedback link (48) provided to operatively connect the top link swing bracket (42) to a lifting control valve, which controls the lifting of the three-point hitch, so that the top link swing bracket (42) and the lifting control valve operate in association with each other.

8. A tractor comprising:
the draft control device according to claim 1; and
a lifting control valve (50) compensating an oil pressure of a three-point hitch lifting cylinder in proportion to a displacement of the draft control device, which is displaced according to a change of the traction load of the work machine.

9. A tractor comprising:
the draft control device according to claim 2; and
a lifting control valve (50) compensating an oil pressure of a three-point hitch lifting cylinder in proportion to a displacement of the draft control device, which is displaced according to a change of the traction load of the work machine.

10. A tractor comprising:
the draft control device according to claim 3; and
a lifting control valve (50) compensating an oil pressure of a three-point hitch lifting cylinder in proportion to a displacement of the draft control device, which is displaced according to a change of the traction load of the work machine.

11. A tractor comprising:
the draft control device according to claim 4; and
a lifting control valve (50) compensating an oil pressure of a three-point hitch lifting cylinder in proportion to a displacement of the draft control device, which is displaced according to a change of the traction load of the work machine.

12. A tractor comprising:
the draft control device according to claim 5; and
a lifting control valve (50) compensating an oil pressure of a three-point hitch lifting cylinder in proportion to a displacement of the draft control device, which is displaced according to a change of the traction load of the work machine.

13. A tractor comprising:
the draft control device according to claim 6; and
a lifting control valve (50) compensating an oil pressure of a three-point hitch lifting cylinder in proportion to a displacement of the draft control device, which is displaced according to a change of the traction load of the work machine.

14. A tractor comprising:
the draft, control device according to claim 7; and
a lifting control valve (50) compensating an oil pressure of a three-point hitch lifting cylinder in proportion to a displacement of the draft control device, which is displaced according to a change of the traction load of the work machine.

\* \* \* \* \*